(12) United States Patent  
Choi

(10) Patent No.: US 12,445,565 B2  
(45) Date of Patent: Oct. 14, 2025

(54) IMAGE PROCESSING DEVICE AND IMAGE PROCESSING METHOD

(71) Applicant: SK hynix Inc., Icheon-si (KR)

(72) Inventor: Jun Hyeok Choi, Icheon-si (KR)

(73) Assignee: SK hynix Inc., Icheon-si (KR)

( * ) Notice: Subject to any disclaimer, the term of this patent is extended or adjusted under 35 U.S.C. 154(b) by 245 days.

(21) Appl. No.: 18/316,121

(22) Filed: May 11, 2023

(65) Prior Publication Data

US 2024/0179263 A1 May 30, 2024

(30) Foreign Application Priority Data

Nov. 29, 2022 (KR) .......................... 10-2022-0162983

(51) Int. Cl.
*H04N 1/60* (2006.01)
*G06V 10/56* (2022.01)
*G06V 10/75* (2022.01)
*H04N 25/11* (2023.01)

(52) U.S. Cl.
CPC .............. *H04N 1/60* (2013.01); *G06V 10/56* (2022.01); *G06V 10/751* (2022.01); *H04N 25/11* (2023.01)

(58) Field of Classification Search
CPC ........ H04N 1/60; H04N 25/11; H04N 25/134; H04N 25/704; H04N 25/67; H04N 25/705; G06V 10/56; G06V 10/751
See application file for complete search history.

(56) References Cited

U.S. PATENT DOCUMENTS

| 2020/0280659 | A1 | 9/2020 | Gluskin |
| 2020/0336684 | A1* | 10/2020 | Wang .................. H04N 23/843 |
| 2021/0126033 | A1 | 4/2021 | Yang et al. |

* cited by examiner

*Primary Examiner* — Christopher Wait
(74) *Attorney, Agent, or Firm* — WILLIAM PARK AND ASSOCIATES LTD.

(57) ABSTRACT

An image processing device may include: a target pixel set determiner for determining a target pixel set, among a plurality of Phase Detection Auto Focus (PDAF) pixel sets, based on average values and variance values of pixel values output from a plurality of pixels corresponding to a kernel set based on each of the plurality of PDAF pixel sets, wherein the average values and the variance values respectively correspond to colors of color filters included in the plurality of pixels; and a pixel value corrector for converting pixel values of the target pixel set into first pixel values corresponding to a predetermined color and correcting the first pixel values to second pixel values corresponding to an arrangement pattern of the plurality of pixels based on pixel values of a plurality of adjacent pixels adjacent to the target pixel set.

18 Claims, 11 Drawing Sheets

FIG. 2

| Gr | Gr | Gr | R  | R  | R  | Gr | Gr |
|----|----|----|----|----|----|----|----|
| Gr | Gr | Gr | R  | R  | R  | Gr | Gr |
| Gr | Gr | Gr | R  | R  | R  | Gr | Gr |
| B  | B  | B  | Gb | Gb | Gb | B  | B  |
| B  | B  | B  | Gb | Gb | Gb | B  | B  |
| B  | B  | B  | Gb | Gb | Gb | B  | B  |
| Gr | Gr | Gr | R  | R  | R  | Gr | Gr |
| Gr | Gr | Gr | R  | R  | R  | Gr | Gr |

| G | B | B | B | G | G | G | B |
|---|---|---|---|---|---|---|---|
| G | B | B | B | G | G | G | B |
| R | G | G | T1 | T2 | R | R | G |
| R | G | G | T3 | T4 | R | R | G |
| R | G | G | G | R | R | R | G |
| G | B | B | B | G | G | G | B |

FIG. 5

| AVERAGE VALUE RANGE | THRESHOLD VALUE |
|---|---|
| $0 \leq Mg < Ga$ | Gth1 |
| $Ga \leq Mg < Gb$ | Gth2 |
| $Gb \leq Mg$ | Gth3 |
| $0 \leq Mb < Ba$ | Bth1 |
| $Ba \leq Mb < Bb$ | Bth2 |
| $Bb \leq Mb$ | Bth3 |
| $0 \leq Mr < Ra$ | Rth1 |
| $Ra \leq Mr < Rb$ | Rth2 |
| $Rb \leq Mr$ | Rth3 |

FIG. 6

| G | B | B | B | G | G | G | B |
|---|---|---|---|---|---|---|---|
| G | B | B | B | G | G | G | B |
| R | G | G | G1' | G3' | R | R | G |
| R | G | G | G2' | G4' | R | R | G |
| R | G | G | G | R | R | R | G |
| G | B | B | B | G | G | G | B |

FIG. 7

| G | B | B | B | G | G | G | B |
|---|---|---|---|---|---|---|---|
| G | B | B | B | G | G | G | B |
| R | G | G1 | G1' | R1' | R1 | R | G |
| R | G | G2 | G2' | R2' | R2 | R | G |
| R | G | G3 | G4 | R4 | R3 | R | G |
| G | B | B | B | G | G | G | B |

FIG. 8

| G | B | B | B | G | G | G | B |
|---|---|---|---|---|---|---|---|
| G | B | B | B | G | G | G | B |
| R | G | G1 | G1" | R1" | R1 | R | G |
| R | G | G2 | G2" | R2" | R2 | R | G |
| R | G | G3 | G4 | R4 | R3 | R | G |
| G | B | B | B | G | G | G | B |

IMAGE PROCESSING DEVICE AND IMAGE PROCESSING METHOD

CROSS-REFERENCE TO RELATED APPLICATION

The present application claims priority under 35 U.S.C. § 119(a) to Korean patent application number 10-2022-0162983 filed on Nov. 29, 2022, in the Korean Intellectual Property Office, the entire disclosure of which is incorporated by reference herein.

BACKGROUND

1. Technical Field

The present disclosure generally relates to an image processing device, and more particularly, to an image processing device and an image processing method.

2. Related Art

An image sensor may be generally divided into a Charge Coupled Device (CCD) image sensor and a Complementary Metal Oxide Semiconductor (CMOS) image sensor. Recently, the CMOS image sensor, which has a low manufacturing cost, low power consumption, and easy integration with a peripheral circuit, has received attention.

An image sensor included in a smartphone, a tablet PC, a digital camera, and the like may convert light reflected from an external object into an electrical signal, thereby acquiring image information on the external object. An image processing device may perform an image processing operation based on pixel values received from the image sensor.

The image sensor may include Phase Detection Auto Focus (PDAF) pixels for a PDAF control operation. Unlike normal pixels, the PDAF pixel may be treated as a defect pixel in an image, and hence, a correction operation on a pixel value of the PDAF pixel may be required. Therefore, a method capable of increasing the accuracy of a PDAF pixel value correction operation in an image of low complexity may be required.

SUMMARY

In accordance with an aspect of the present disclosure, there is provided an image processing device including: a target pixel set determiner configured to determine a target pixel set, among a plurality of Phase Detection Auto Focus (PDAF) pixel sets, based on average values and variance values of pixel values output from a plurality of pixels corresponding to a kernel set based on each of the plurality of PDAF pixel sets, wherein the average values and the variance values respectively correspond to colors of color filters included in the plurality of pixels; and a pixel value corrector configured to convert pixel values of the target pixel set into first pixel values corresponding to a predetermined color and configured to correct the first pixel values to second pixel values corresponding to an arrangement pattern of the plurality of pixels based on pixel values of a plurality of adjacent pixels adjacent to the target pixel set.

In accordance with another aspect of the present disclosure, there is provided an image processing device including: a target pixel set determiner configured to determine a target pixel set, among a plurality of Phase Detection Auto Focus (PDAF) pixel sets, based on average values and variance values of pixel values output from a plurality of pixels including a plurality of normal pixels and a plurality of PDAF pixels; and a pixel value corrector configured to convert pixel values of the target pixel set into normal pixel values based on pixel values of the plurality of normal pixels and configured to correct the normal pixel values to pixel values corresponding to an arrangement pattern of the plurality of pixels based on pixel values of a plurality of adjacent pixels adjacent to the target pixel set, wherein the plurality of pixels corresponds to a kernel set based on each of the plurality of PDAF pixel sets, and wherein the average values and the variance values respectively correspond to colors of color filters included in the plurality of pixels.

In accordance with another aspect of the present disclosure, there is provided an image processing method including: calculating average values and variance values respectively corresponding to colors of color filters included in a plurality of pixels corresponding to a kernel set based on each of a plurality of Phase Detection Auto Focus (PDAF) pixel sets; determining a target pixel set, among the plurality of PDAF pixel sets, corresponding to a flat surface as a region in which complexity of an image is lower than a reference value, based on the average values and the variance values; converting pixel values of the target pixel set into first pixel values corresponding to a predetermined color; and correcting the first pixel values to second pixel values corresponding to an arrangement pattern of the plurality of pixels, based on pixel values of a plurality of adjacent pixels adjacent to the target pixel set.

BRIEF DESCRIPTION OF THE DRAWINGS

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the example embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 2 is a diagram illustrating a pattern of a color filter array included in an image sensor.

FIG. 5 is a diagram illustrating color average values respectively corresponding to colors of color filters included in pixels and a threshold value for determining a target pixel set in accordance with an embodiment of the present disclosure.

FIG. 6 is a diagram illustrating a kernel in which pixel values of a target pixel set are changed to normal pixel values in accordance with an embodiment of the present disclosure.

FIG. 7 is a diagram illustrating a kernel in which pixel values of the target pixel set are changed according to an arrangement pattern of the kernel in accordance with an embodiment of the present disclosure.

FIG. 8 is a diagram illustrating a kernel in which pixel values of the target pixel set are corrected in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, exemplary embodiments of the present disclosure will be described in detail with reference to the accompanying drawings in order for those skilled in the art to be able to readily implement the technical spirit of the present disclosure.

Embodiments provide an image processing device and an image processing method, which can improve the accuracy of a PDAF pixel value correction operation at a flat surface as a region including pixels having a difference between pixel values, which is smaller than a reference value, among a plurality of PDAF pixel sets by detecting a Phase Detection Auto Focus (PDAF) pixel set corresponding to the flat surface, converting a pixel value of the detected PDAF pixel set into normal pixel values, and correcting the normal pixel values, based on adjacent pixel values.

Figure 1:
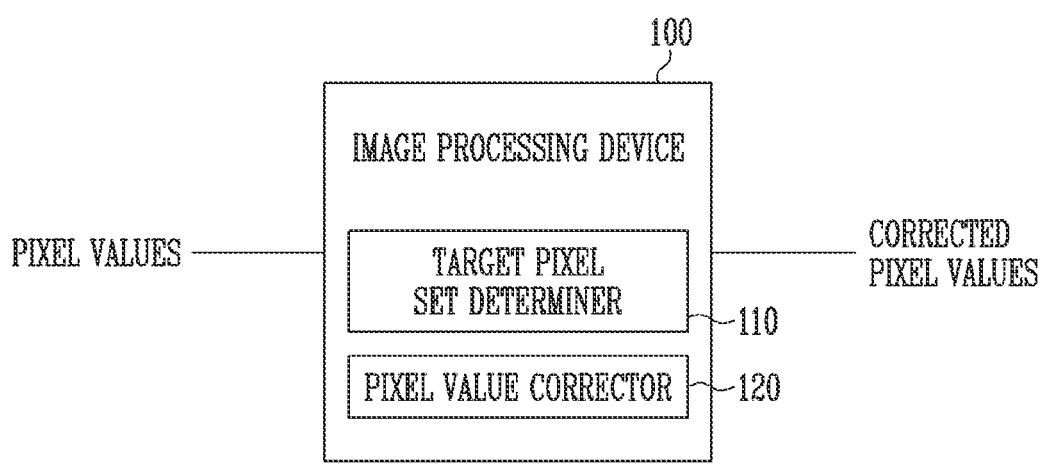
FIG. 1 is a diagram illustrating an image processing device in accordance with an embodiment of the present disclosure.

FIG. 1 is a diagram illustrating an image processing device in accordance with an embodiment of the present disclosure.

Referring to FIG. 1, the image processing device 100 may perform an image processing operation based on pixel values received from an external device and may output corrected pixel values. For example, the image processing device 100 may receive pixel values from an image sensor. The image sensor may include normal pixels and Phase Detection Auto Focus (PDAF) pixels. Pixel values generated by the image sensor may include pixel values of the PDAF pixels.

PDAF pixel values may cause imbalance in an image. The image processing device 100 may correct the PDAF pixel values, thereby reducing noise occurring in an image. The image processing device 100 may correct pixel values of pixels, corresponding to a kernel set based on a PDAF pixel set included in the image sensor, and may process image. The image processing device 100 may include a target pixel set determiner 110 and a pixel value corrector 120.

The target pixel set determiner 110 may determine a target pixel set, among a plurality of PDAF pixel sets, based on average values and variance values of pixel values output from pixels including color filters of the same color.

The pixel value corrector 120 may change pixel values of the target pixel set according to a predetermined method. The pixel value corrector 120 may correct the pixel values of the target pixel set based on adjacent pixel values of the target pixel set. In an embodiment of the present disclosure, the adjacent pixel values of the target pixel set may mean pixel values of pixels included in a predetermined range from the target pixel set. The range of the adjacent pixel values may vary according to a position of the target pixel set, a distance of the target pixel set, and a color of a color filter included in a pixel of the target pixel set. In this specification, a color of a pixel may be defined by a color of a color filter corresponding to the pixel.

In another embodiment of the present disclosure, the target pixel set determiner 110 may calculate average values and variance values according to a color of pixels corresponding to a kernel set based on a PDAF pixel set. The target pixel set determiner 110 may determine a target pixel set, among a plurality of PDAF pixel sets, in which the complexity of the kernel is low based on the average values and the variance values according to the color of the pixels. The target pixel set determiner 110 may set a threshold value for each color based on an average value of pixel values for each color. The target pixel set determiner 110 may determine the target pixel set based on the threshold value for each color and the variance value of the pixel values for each color. The target pixel set determiner 110 may determine, as the target pixel set, a PDAF pixel set in which the variance value of the pixel values for each color is smaller than the threshold value for each color.

One normal pixel may correspond to one microlens, and one PDAF pixel may correspond to a plurality of microlenses. Therefore, characteristics of the PDAF pixel and the normal pixel may be different from each other. Due to a characteristic difference between pixels, a PDAF pixel value may be treated as noise when an image is expressed. The pixel value corrector 120 may convert PDAF pixel values of the target pixel set such that PDAF pixels of the target pixel set have the same characteristic as normal pixels. The PDAF pixel having the converted pixel value may be treated as a virtual normal pixel. The pixel value corrector 120 may convert the PDAF pixel values of the target pixel set into virtual normal pixel values.

The pixel value corrector 120 may correct the virtual normal pixel values to pixel values corresponding to an arrangement pattern of the kernel. The pixel value corrector 120 may convert the PDAF pixel values of the target pixel set into the virtual normal pixel values according to a characteristic difference between the normal pixels and the PDAF pixels. Based on an arrangement pattern of color filters included in adjacent pixels, the pixel value corrector 120 may determine a color of color filters included in target pixels included in the target pixel set. The pixel value corrector 120 may convert the virtual normal pixel values into pixel values corresponding to the color of the color filters included in the target pixels. The pixel value corrector 120 may correct the pixel values of the target pixels based on an average pixel value of pixels corresponding to the color of the color filters included in the target pixels, among the adjacent pixel values.

FIG. 2 is a diagram illustrating a pattern of a color filter array included in the image sensor.

Referring to FIG. 2, the color filter array may be arranged in a predetermined pattern. In an embodiment of the present disclosure, a pattern of the color filter array included in the image sensor for outputting pixel values to the image processing device may be a nona-cell pattern. The pattern of the color filter array, which is shown in FIG. 2, is merely an embodiment, and the present disclosure is not limited thereto. The pattern of the color filter array may be a Bayer pattern, a quad Bayer pattern, or a hexa-deca pattern.

The nona-cell pattern may be implemented by a plurality of cell units, each including pixels arranged in a 6×6 form. Each of the plurality of cell units may include eighteen pixels having a green (Gb, Gr) color filter, nine pixels having a blue (B) color filter, and nine pixels having a red (R) color filter. One cell unit may include four pixel groups arranged in a 3×3 form. Each of the four pixel groups may include pixels including a color filter of the same color. Pixel groups configured with pixels having the green (Gb, Gr) color filter in one cell unit may be disposed in a diagonal direction. A pixel group configured with pixels having the blue (B) color filter and a pixel group configured with pixels having the red (R) color filter in one cell unit may be disposed in a diagonal direction.

The arrangement of thirty-six pixels (B, Gb, Gr, B) is not necessarily limited to the arrangement structure shown in FIG. 2, and the thirty-six pixels (B, Gb, Gr, B) may be variously arranged based on the above-described nona-cell pattern.

The image sensor may generate pixel values corresponding to a color determined by the color filter array. The pixel values generated by the image sensor may be transferred to the image processing device. The image processing device may perform an image processing operation based on the received pixel values.

Figures 3, 4:
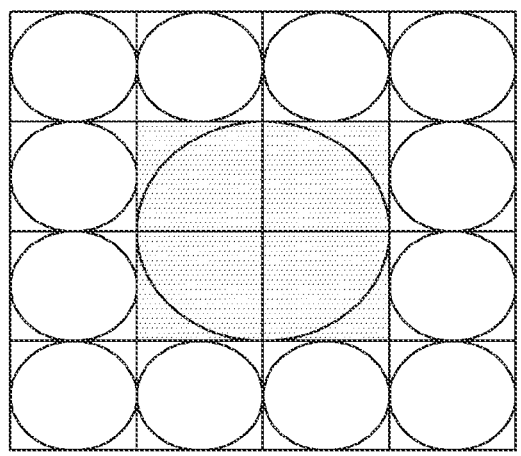
FIG. 3 is a diagram illustrating a pixel array including normal pixels and Phase Detection Auto Focus (PDAF) pixels, which is included in the image sensor.
FIG. 4 is a diagram illustrating a kernel set based on a PDAF pixel set.

FIG. 3 is a diagram illustrating a pixel array including normal pixels and PDAF pixels, which is included in the image sensor.

Referring to FIG. 3, the pixel array included in the image sensor, which is input to the image processing device in accordance with the embodiment of the present disclosure, may include normal pixels and PDAF pixels. In FIG. 3, pixels indicated by shadow may be PDAF pixels, and the other pixels may be normal pixels.

The image sensor may include a pixel array in which a plurality of pixels are arranged. A normal pixel may be a pixel for generating an image by converting incident light into an electrical signal. A photodiode included in the normal pixel may correspond one-to-one to a microlens disposed thereabove.

A PDAF pixel may be a pixel for performing PDAF control operation by using a phase difference between pixels sharing a microlens. PDAF pixels may be pixels corresponding to a plurality of pixels adjacent to a microlens. For example, the PDAF pixels may be disposed to be adjacent to each other, and a plurality of PDAF pixels adjacent to each other may share one microlens. The plurality of PDAF pixels that are disposed to be adjacent to each other to share the one microlens may form one PDAF pixel set.

One PDAF pixel set and twelve normal pixels, which are shown in FIG. 3, may be a portion of the pixel array. The pixel array may include a plurality of PDAF pixel sets. The PDAF pixel sets may be located at predetermined positions. The PDAF pixel sets may be arranged at a constant distance in the pixel array. In another embodiment of the present disclosure, the PDAF pixel sets may be irregularly arranged in the pixel array.

For convenience of description, a case in which four pixels share one microlens is illustrated in FIG. 3. However, the present disclosure is not limited thereto, and the number of PDAF pixels sharing one microlens may vary. For example, two PDAF pixels arranged in parallel to each other in one direction may share one microlens.

A PDAF pixel value generated in a PDAF pixel may be different from a normal pixel value generated in a normal pixel. Shapes, sizes, and/or characteristics of a microlens included in the normal pixel and a microlens shared by the PDAF pixels may be different from each other. Therefore, although the same light is input to pass through a color filter of the same color, an output pixel value may vary. The image processing device may perform a correction operation on PDAF pixel values of PDAF pixels determined to be defect pixels. The image processing device may correct PDAF pixel values and may change the corrected PDAF pixel values to pixel values corresponding to normal pixels.

FIG. 4 is a diagram illustrating a kernel set based on the PDAF pixel set.

Referring to FIG. 4, a kernel set based on the PDAF pixel set may be illustrated. The kernel may have a size of 8×6. The kernel may be a logical component for calculating and processing pixel values output from the image sensor. In FIG. 4, for convenience of description, the kernel may be illustrated as a predetermined region set on an image. In the image processing device, in accordance with the embodiment of the present disclosure, the kernel may be set to be located at the center of the PDAF pixel set. The PDAF pixel set may include four PDAF pixels. In FIG. 4, the color filter array may be arranged in a nona-cell pattern, and the kernel may correspond to a portion of the color filter array. The kernel, shown in FIG. 4, is merely an embodiment of the present disclosure, and the shape, size, pattern, and the like of the kernel may vary.

The kernel may be set to include a region corresponding to the PDAF pixel set and the normal pixels, which are included in the image sensor. The normal pixels corresponding to the kernel may include one of green (G), red (R), and blue (B) color filters. The target pixel set determiner included in the image processing device may determine, as a target pixel set, the PDAF pixel set included in the kernel.

The pixel array of the image sensor may include a plurality of PDAF pixel sets. The image processing device may correct pixel values of pixels corresponding to a kernel set based on each of the plurality of PDAF pixel sets and may process an image. The target pixel set determiner may determine a target pixel set, among the plurality of PDAF pixel sets, based on average values and variance values of pixel values for each color with respect to pixels.

Based on forty-four pixel values except PDAF pixel values, among forty-eight pixel values of the kernel, the target pixel set determiner may calculate average values and variance values of pixel values according to a color of color filters. The target pixel set determiner may calculate an average green pixel value Mg of pixel values of twenty-two pixels including a green color filter, an average red pixel value Mr of pixel values of ten pixels including a red color filter, and an average blue pixel value Mb of pixel values of twelve pixels including a blue color filter. The target pixel set determiner may calculate a green variance value Vg representing a variance of the twenty-two green pixel values, a red variance value Vr representing a variance of the ten red pixel values, and a blue variance value Vb representing a variance of the twelve blue pixel values.

The target pixel set determiner may set a green threshold value Gth, a red threshold value Rth, and a blue threshold value Bth based on the average green pixel value Mg, the average red pixel value Mr, and the average blue pixel value Mb. The target pixel set determiner may determine whether the PDAF pixel set corresponds to the target pixel set based on a result obtained by comparing the green threshold value Gth and the green variance value Vg with each other, a result obtained by comparing the red threshold value Rth and the red variance value Vr with each other, and a result obtained by comparing the blue threshold value Bth and the blue variance value Vb with each other.

In another embodiment of the present disclosure, when the kernel includes a region corresponding to PDAF pixels different from the PDAF pixels which become a basis of kernel setting, the target pixel set determiner may calculate average values and variance values of pixel values according to a color of a color filter based on normal pixel values except PDAF pixels, among pixels corresponding to the region of the kernel.

FIG. 5 is a diagram illustrating color average values respectively corresponding to colors of color filters included in pixels and a threshold value for determining a target pixel set in accordance with an embodiment of the present disclosure.

Referring to FIG. 5, average value sections with respect to colors and threshold values corresponding to the average value sections. In FIG. 5, for convenience of description, average value sections corresponding to each color are set to three sections. However, the average value sections may be set differently from those shown in FIG. 5. For example, average value sections of red pixels may be set to two sections, and average value sections of blue pixels may be set to four or more sections.

The target pixel set determiner may set a plurality of average value sections. The target pixel set determiner may generate first threshold values corresponding to the plurality of average value sections.

In FIG. 5, three average value sections may be set for each color, and first threshold values Gth1, Gth2, Gth3, Rth1, Rth2, Rth3, Bth1, Bth2, and Bth3, respectively corresponding to the average value sections, may be set. Specifically, with respect to an average green pixel value, a threshold value Gth1 corresponding to a first section (0≤Mg<Ga) may be set, a threshold value Gth2 corresponding to a second section (Ga≤Mg<Gb) may be set, and a threshold value Gth3 corresponding to a third section (Gb≤Mg) may be set. Similarly, a plurality of sections and threshold values may be set with respect to an average red pixel value and an average blue pixel value.

In an embodiment of the present disclosure, threshold values corresponding to average value sections for each color may be set to be different from each other. Since wavelengths of corresponding lights according to colors are different from each other, set average value sections and set threshold values may be different from each other.

The target pixel set determiner may set a threshold value based on the magnitude of an average value. For example, the magnitude of an average value being small may mean that a sensed image is dark. Therefore, a low threshold value may be set. On the contrary, the target pixel set determiner may set a high threshold value with respect to a section in which the magnitude of an average value is large, thereby determining the complexity of a bright image.

In an embodiment of the present disclosure, the target pixel set determiner may generate a plurality of average value sections and first threshold values, which are different from each other, according to colors of color filters included in pixels. For example, when the colors of the color filters included in the pixels are green, red, and blue, regions including an average pixel value of pixels including a green color filter and regions including an average pixel value of pixels including a red color filter may be different from each other.

Based on the average values of pixel values respectively corresponding to the colors of the color filters included in the pixels, the target pixel set determiner may determine one of the first threshold values as second threshold values corresponding to the colors of the color filters included in the pixels. The target pixel set determiner may determine a target pixel set, among the plurality of PDAF pixel sets, corresponding to the variance values of the pixel values respectively corresponding to the colors of the color filters included in the pixels.

The target pixel set determiner may determine second threshold values respectively corresponding to the colors, among the first threshold values Gth1, Gth2, Gth3, Rth1, Rth2, Rth3, Bth1, Bth2, and Bth3, based on the average values Mg, Mr, and Mb. For example, Gth2, Rth1, and Bth3 may be determined as the second threshold values. The target pixel set determiner may determine, as the target pixel set, a PDAF pixel set when the green variance value Vg is smaller than Gth2, the red variance value Vr is smaller than Rth1, and the blue variance value Vb is smaller than Bth3. In an embodiment of the present disclosure, the target pixel set may include target pixel values T1, T2, T3, and T4.

In an embodiment of the present disclosure, PDAF pixel values corresponding to the other PDAF pixel sets that are not determined as the target pixel set, among the plurality of PDAF pixel sets, may be changed to virtual normal pixel values through a nonlinear function. The PDAF pixel values may be corrected to virtual normal pixel values by using pixel values at predetermined positions based on the directionality of peripheral pixel values of the PDAF pixels.

FIG. 6 is a diagram illustrating a kernel in which pixel values of a target pixel set are changed to normal pixel values in accordance with an embodiment of the present disclosure.

Referring to FIG. 6, pixel values T1, T2, T3, and T4 included in the target pixel set shown in FIG. 4 may be converted into normal pixel values G1', G2', G3', and G4' corresponding to a predetermined color. The pixel value corrector may convert the pixel values of the target pixel set into first pixel values corresponding to the predetermined color. In an embodiment of the present disclosure, the predetermined color may be a green color. In another embodiment of the present disclosure, the PDAF pixel values may be converted into pixel values corresponding to a red color or a blue color.

The pixel value corrector may calculate an average value Mt of the PDAF pixel values T1, T2, T3, and T4. The average value Mt is shown in the following expression.

$$Mt=(T1+T2+T3+T4)/4$$

The pixel value corrector may correct the first pixel values to second pixel values corresponding to the arrangement pattern of the kernel. The pixel value corrector may calculate a calibration gain value Gc based on a ratio between the normal pixel value and the PDAF pixel value. The pixel value corrector may generate the first pixel values based on the average value of the target pixel set and the calibration gain value.

The target pixel set determiner may convert the PDAF pixel values T1, T2, T3, and T4 into the normal pixel values G1', G2', G3', and G4' of the pixels including the green color filter based on the average value Mt of the PDAF pixel values T1, T2, T3, and T4 and the calibration gain value Gc. The normal pixel values G1', G2', G3', and G4' of the pixels including the green color filter are shown in the following expression.

$$G1'=(T1+Mt)/2*Gc$$

$$G2'=(T2+Mt)/2*Gc$$

$$G3'=(T3+Mt)/2*Gc$$

$$G4'=(T4+Mt)/2*Gc$$

In an embodiment of the present disclosure, the normal pixel values G1', G2', G3', and G4' of the pixels including the green color filter may be the first pixel values. The pixel value corrector may convert the PDAF pixel values T1, T2, T3, and T4 of the target pixel set into the first pixel values.

FIG. 7 is a diagram illustrating a kernel in which pixel values of the target pixel set are changed according to the arrangement pattern of the kernel in accordance with an embodiment of the present disclosure.

Referring to FIG. 7, the normal pixel values G1', G2', G3', and G4' corresponding to target pixels may be converted into normal pixel values corresponding to the arrangement pattern of the kernel. FIG. 7 exemplarily illustrates an embodiment of the arrangement pattern of the kernel, and therefore, the arrangement pattern of the kernel may vary. According to the arrangement pattern of the kernel, the normal pixel values G1', G2', G3', and G4' may be converted into the pixel value of the pixel including the blue color filter or the pixel value of the pixel including the red color filter or may be maintained as the pixel value of the pixel including the green color filter.

The pixel value corrector may determine a color of each of the target pixels included in the target pixel set based on an arrangement pattern of color filters included in adjacent pixels adjacent to the target pixels. The pixel value corrector may convert the first pixel values into third pixel values corresponding to the color of the target pixels. The pixel value corrector may calculate a second pixel value based on an average pixel value of pixels corresponding to the color of the target pixels, among adjacent pixel values and the third pixel values.

In an embodiment of the present disclosure, the pixel value corrector may convert some of the normal pixel values G1', G2', G3', and G4' of the pixels including the green color filter into normal pixel values of the pixels including the red color filter based on the arrangement pattern of the kernel. According to the arrangement pattern of the kernel, the target pixels T1 and T3 of FIG. 4 may be converted into pixels including the green color filter, and the target pixel T2 and T4 of FIG. 4 may be converted into pixels including the red color filter.

Since the PDAF pixels are converted into the normal pixels G1', G2', G3', and G4' of the pixels including the green color filter, the pixel value corrector may convert G3' and G4' into R1' and R2' to enable the color of the color filter included in the target pixels to correspond to the arrangement pattern of the kernel.

The pixel value corrector may convert the green color pixel value into the pixel value of the pixel including the red color filter based on the average green pixel value Mg and the average red pixel value Mr. The pixel values R1' and R2' of the pixels including the red color filter are shown in the following expression.

$$R1'=G3'*Mr/Mg$$

$$R2'=G4'*Mr/Mg$$

In an embodiment of the present disclosure, G1' and G2', which are normal pixel values of pixels including the green color filter, and R1' and R2', which are normal pixel values of pixels including the red color filter, may be third pixel values. The third pixel values may be corrected to second pixel values by adjacent pixel values.

FIG. 8 is a diagram illustrating a kernel in which pixel values of the target pixel set are corrected in accordance with an embodiment of the present disclosure.

Referring to FIG. 8, a kernel in which point noise generated by the PDAF pixel values is removed may be illustrated. The PDAF pixel values may be converted into normal color pixel values corresponding to the arrangement pattern of the kernel. The pixel value corrector may correct the normal color pixel value of the target pixel set based on adjacent pixel values of the target pixel set.

The pixel value corrector may correct pixel values based on an average pixel value of adjacent pixels of which color filters have the same color as a color filter included in a corrected pixel. Specifically, the pixel value corrector may calculate an average pixel value Mg1 of adjacent pixels G1 and G2 of which color filters have the same color as the color filter included in G1', an average pixel value Mg2 of adjacent pixels G2, G3, and G4 of which color filters have the same color as the color filter included in G2', an average pixel value Mr1 of adjacent pixels R1 and R2 of which color filters have the same color as the color filter included in R1', and an average pixel value Mr2 of adjacent pixels R2, R3, and R4 of which color filters have the same color as the color filter included in R2'. The average values Mg1, Mg2, Mr1, and Mr2 are shown in the following expression.

$$Mg1=(G1+G2)/2$$

$$Mg2=(G2+G3+G4)/3$$

$$Mr1=(R1+R2)/2$$

$$Mr2=(R2+R3+R4)/3$$

The pixel value corrector may correct the pixel values of the target pixel set by using the average values Mg1, Mg2, Mr1, and Mr2 and an average of the pixel values G1', G2', R1', and R2'. The corrected pixel values G1", G2", R1", and R2" are shown in the following expression.

$$G1''=(G1'+Mg1)/2$$

$$G2''=(G2'+Mg2)/2$$

$$R1''=(R1'+Mr1)/2$$

$$R2''=(R2'+Mr2)/2$$

The PDAF pixel values T1, T2, T3, and T4 of the target pixel set may be corrected as normal pixel values G1", G2", R1", and R2" corresponding to the arrangement pattern of the kernel in which the point noise is removed. In an embodiment of the present disclosure, the normal pixel values G1", G2", R1", and R2" corresponding to the arrangement pattern of the kernel in which the point noise is removed may be second pixel values.

In another embodiment of the present disclosure, the pixel value corrector may determine a weight of third pixel values, based on the average values Mg, Mr, and Mb or the variance values Vg, Vr, and Vb, and may correct the third pixel values to second pixel values based on the weight. For example, the pixel value corrector may provide a weight of k to the third pixel values, based on the average values Mg, Mr, and Mb or the variance values Vg, Vr, and Vb, and may provide a weight of m to the average values Mg1, Mg2, Mr1, and Mr2 of the adjacent pixels. The pixel value corrector may calculate the second pixel values by performing weight summing of the third pixel values and the average values of the adjacent pixels.

In still another embodiment of the present disclosure, the arrangement pattern of the kernel may vary. According to the arrangement pattern of the kernel, the PDAF pixel values of the target pixel set may be corrected to pixel values of pixels including the green color filter and pixel values of pixels including the blue color filter.

Figure 9:
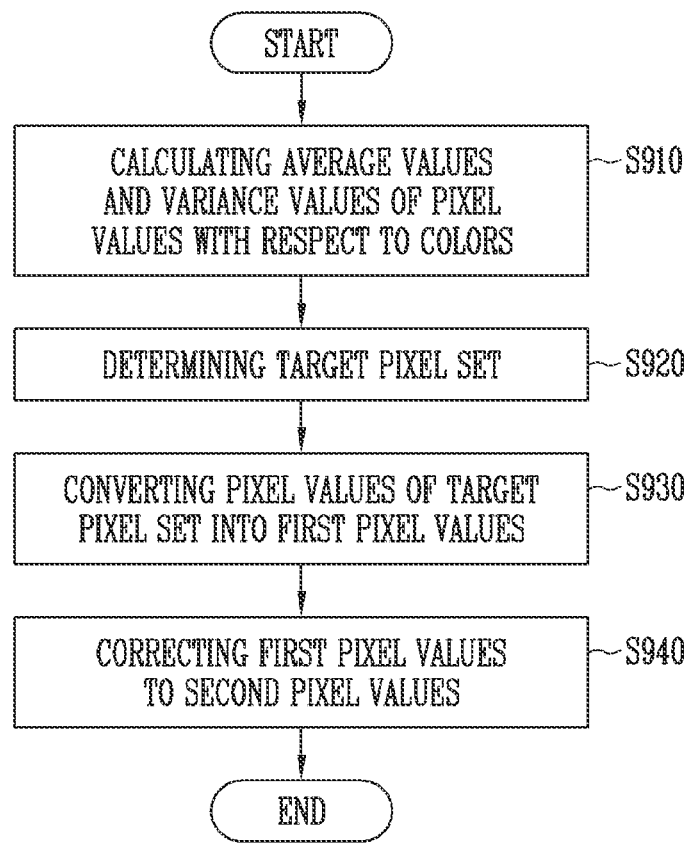
FIG. 9 is a flowchart illustrating a method of correcting pixel values of a target pixel set to normal pixel values corresponding to an arrangement pattern of a kernel in accordance with an embodiment of the present disclosure.

FIG. 9 is a flowchart illustrating a method of correcting pixel values of a target pixel set to normal pixel values corresponding to an arrangement pattern of a kernel in accordance with an embodiment of the present disclosure.

Referring to FIG. 9, based on pixel values received from an external device, the image processing device may correct pixel values corresponding to a PDAF pixel set, among a plurality of PDAF pixel sets, corresponding to a flat surface. The image processing device may remove point noise that may be generated in an image. In an embodiment of the present disclosure, the flat surface may mean a region in which the complexity of an image is low. The complexity of the image may be determined based on a pixel value difference between adjacent pixels. Since a difference in pixel value is not large in a flat surface, it can be helpful in noise removal to correct PDAF pixel values by using peripheral pixel values.

In step S910, the target pixel set determiner may calculate average values and variance values, which respectively correspond to colors of color filters included in a plurality of pixels corresponding to a kernel set based on each of a plurality of PDAF pixel sets. The target pixel set determiner may calculate each of average values and variance values of pixel values of pixels corresponding to a green color, a red color, and a blue color.

In an embodiment of the present disclosure, the target pixel set determiner may adjust a size of the kernel. The target pixel set determiner may increase the size of the kernel so as to increase the accuracy of flat surface determination. In another embodiment of the present disclosure, the target pixel set determiner may decrease the size of the kernel so as to save a resource for the flat surface determination.

In step S920, the target pixel set determiner may determine a target pixel set corresponding to the flat surface, among the plurality of PDAF pixel sets, based on the average values and variance values of the pixel values respectively corresponding to the colors of the color filters. The target pixel set determiner may set threshold values based on the average values of the pixel values respectively corresponding to the colors of the color filters. The target pixel set determiner may compare the set threshold values with the variance values of the pixel values respectively corresponding to the colors of the color filters. The target pixel set determiner may determine, as the target pixel set, a PDAF pixel set in which the variance values of the pixel values respectively corresponding to the colors of the color filters are all smaller than the threshold values.

In step S930, the pixel value corrector may convert pixel values of the target pixel set into first pixel values corresponding to a predetermined color. The predetermined color may be a green color. The pixel value corrector may convert PDAF pixel values into virtual normal pixel values based on a characteristic difference between normal pixels and PDAF pixels.

In step S940, the pixel value corrector may correct the first pixel values to second pixel values, corresponding to the arrangement pattern of the kernel, based on adjacent pixel values of the target pixel set. The pixel value corrector may calculate an average pixel value of adjacent pixels of which color filters have the same color as a color filter included in a target pixel, among adjacent pixels. The pixel value corrector may correct target pixel values based on the average pixel value.

Figure 10:
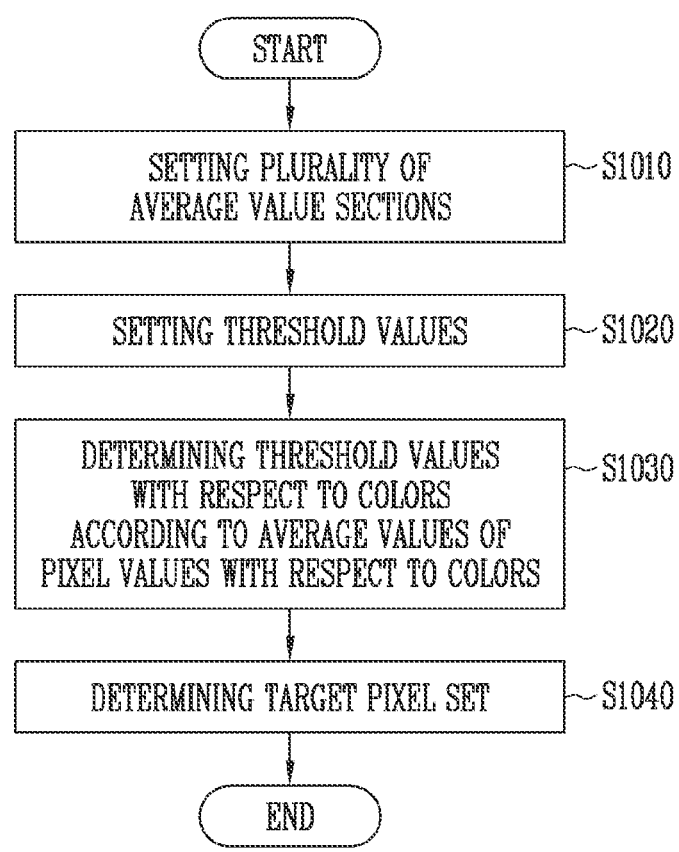
FIG. 10 is a flowchart illustrating a method of determining a target pixel set in accordance with an embodiment of the present disclosure.

FIG. 10 is a flowchart illustrating a method of determining a target pixel set in accordance with an embodiment of the present disclosure.

Referring to FIG. 10, the target pixel set determiner may detect a PDAF pixel set, among a plurality of PDAF pixel sets, included in a kernel of low complexity. The target pixel set determiner may determine a target pixel set to be corrected based on adjacent pixel values.

In step S1010, the target pixel set determiner may set a plurality of average value sections. The target pixel set determiner may set different average value sections with respect to colors of color filters. The target pixel set determiner may set sizes of the average value sections to be different from each other based on magnitudes of average values with respect to colors.

In step S1020, the target pixel set determiner may set each of threshold values corresponding to the plurality of average value sections. The target pixel set determiner may set different threshold values with respect to the colors of the color filters. Since wavelengths of lights are different from each other with respect to the colors of the color filters, the set threshold values may be different from each other with respect to the colors.

In step S1030, the target pixel set determiner may determine threshold values corresponding to average values of pixel values with respect to the colors. For example, the target pixel set determiner may determine a green color threshold value corresponding to a green color average value, determine a red color threshold value corresponding to a red color average value, and determine a blue color threshold value corresponding to a blue color average value.

In step S1040, the target pixel set determiner may determine a target pixel set by comparing the threshold values with respect to the colors with variance values of the pixel values with respect to the colors. The target pixel set determiner may determine, as the target pixel set, a PDAF pixel set in which variance values of pixel values with respect to the colors are all smaller than the threshold values with respect to the colors. For example, a PDAF pixel set included in a kernel in which a green color variance value is smaller than the green color threshold value, a red color variance value is smaller than the red color threshold value, and a blue color variance value is smaller than the blue color threshold value may be determined as the target pixel set.

Figure 11:
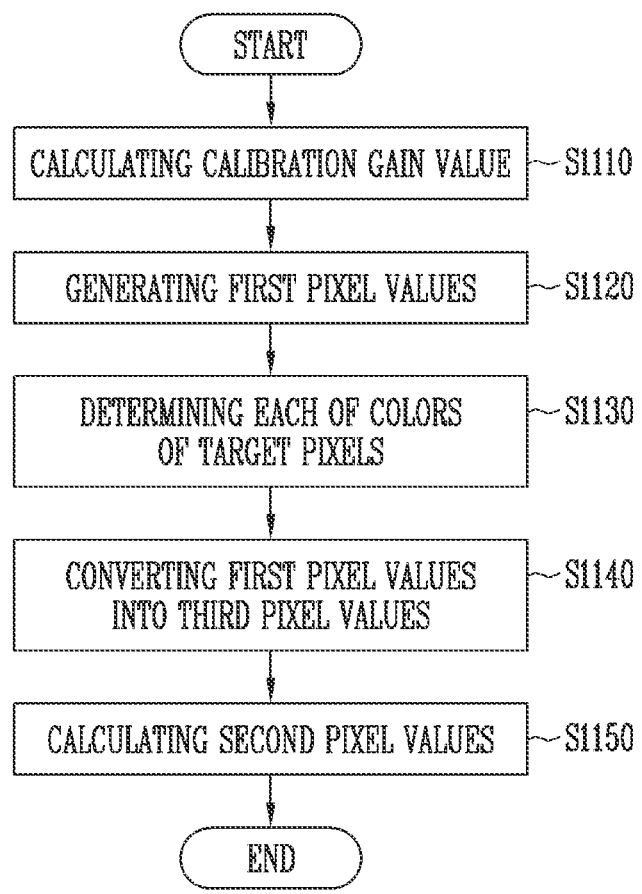
FIG. 11 is a flowchart illustrating a method of correcting pixel values of a target pixel set in accordance with an embodiment of the present disclosure.

FIG. 11 is a flowchart illustrating a method of correcting pixel values of a target pixel set in accordance with an embodiment of the present disclosure.

Referring to FIG. 11, based on adjacent pixel values of adjacent pixels including color filters having the same color, the pixel value corrector may convert PDAF pixel values into virtual normal color pixel values corresponding to an arrangement pattern of a kernel and may correct the converted virtual normal color pixel values.

In step S1110, the pixel value corrector may calculate a calibration gain value obtained by reflecting a difference between PDAF pixel values and normal pixel values. When the PDAF pixel values are multiplied by the calibration gain value, the difference between the PDAF pixel values and the normal pixel values may be compensated.

In step S1120, the pixel value corrector may generate first pixel values based on an average pixel value of a target pixel set and the calibration gain value. The first pixel values may be virtual normal pixel values corresponding to a predetermined color. In an embodiment of the present disclosure, the color of the PDAF pixels may be a green color.

In step S1130, the pixel value corrector may determine each of colors of color filters included in target pixels based on the arrangement pattern of the kernel. For example, the pixel value corrector may determine only some of the color filters included in the target pixels to have another color. In an embodiment of the present disclosure, the colors of the color filters included in the target pixels may be green and blue colors or green and red colors. In another embodiment of the present disclosure, the colors of the color filters included in the target pixels may all be the same.

In step S1140, the pixel value corrector may convert the first pixel values to third pixel values corresponding to the color of the color filters included in the target pixels. The pixel value corrector may calculate a ratio of average pixel values of pixel values of normal pixels corresponding to the kernel for each color. The pixel value corrector may change a color of color filters included in the pixels by multiplying the pixel values by the calculated ratio for each color.

In step S1150, the pixel value corrector may calculate second pixel values based on an average pixel value of pixels corresponding to the color of the color filters included in the target pixels, among adjacent pixel values and the third pixel values. In the kernel including the second pixel values, generation of point noise can be reduced.

In an embodiment of the present disclosure, the pixel value corrector may determine a weight of the third pixel values based on average values or variance values with respect to colors. The pixel value corrector may calculate the second pixel values based on the determined weight. Specifically, the pixel value corrector may calculate the second pixel values by calculating an average value of the third pixel values multiplied by the weight and the average pixel value of the adjacent pixel values.

Figure 12:
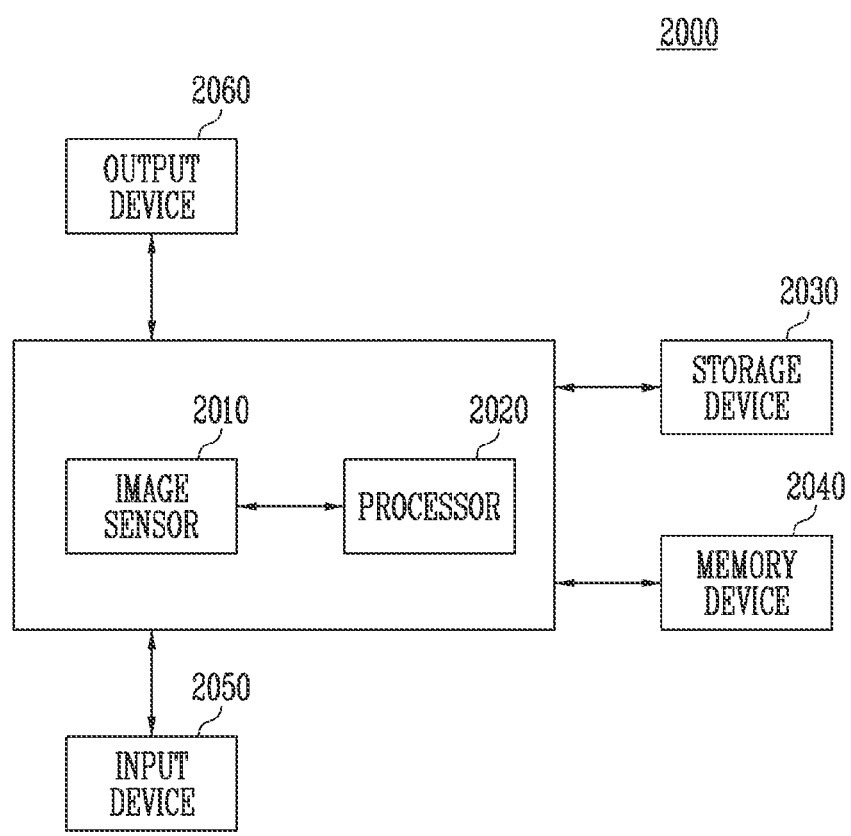
FIG. 12 is a block diagram illustrating an electronic device including an image processing device in accordance with an embodiment of the present disclosure.

FIG. 12 is a block diagram illustrating an electronic device including an image processing device in accordance with an embodiment of the present disclosure.

Referring to FIG. 12, the electronic device 2000 may include an image sensor 2010, a processor 2020, a storage device 2030, a memory device 2040, an input device 2050, and an output device 2060. Although not shown in FIG. 12, the electronic device 2000 may further include ports capable of communicating with a video card, a sound card, a memory card, a USB device, and the like, or communicating with other electronic devices.

The image sensor 2010 may generate image data corresponding to incident light. In an embodiment of the present disclosure, the image sensor 2010 may generate image data including normal pixel values and PDAF pixel values. The image data may be transferred to the processor 2020 to be processed by the processor 2020. The output device 2060 may display the image data. The storage device 2030 may store the image data. The processor 2020 may control operations of the image sensor 2010, the output device 2060, and the storage device 2030.

The processor 2020 may be an image processing device that calculates and processes image data received from the image sensor 2010 and outputs the processed image data. The processing may be Electronic Image Stabilization (EIS), interpolation, color tone correction, image quality correction, size adjustment, or the like.

In an embodiment of the present disclosure, the processor 2020 may determine a target pixel set, among a plurality of PDAF pixel sets, based on average values and variance values of pixel values output from a plurality of pixels corresponding to a kernel set based on each of the plurality of PDAF pixel sets. Based on adjacent pixel values, the processor 2020 may change pixel values of the target pixel set to virtual normal pixels and may correct the virtual normal pixels. The processor 2020 may correct the pixel values of the target pixel set to correspond to a pattern of a color filter array included in the image sensor 2010. The processor 2020 may correct PDAF pixel values, thereby reducing noise generated in an image.

The processor 2020 may be implemented as a chip that is independent of the image sensor 2010. For example, the processor 2020 may be implemented with a multi-chip package. In another embodiment of the present disclosure, the processor 2020 may be included as a portion of the image sensor 2010 to be implemented as one chip.

The processor 2020 may execute and control an operation of the electronic device 2000. In accordance with an embodiment of the present disclosure, the processor 2020 may be a microprocessor, a Central Processing Unit (CPU), or an Application Processor (AP). The processor 2020 may be connected to the storage device 2030, the memory device 2040, the input device 2050, and the output device 2060 through an address bus, a control bus, and a data bus, to perform communication.

The storage device 2030 may include a flash memory device, a Solid State Drive (SSD), a Hard Disk Drive (HDD), a CD-ROM, all types of nonvolatile memory devices, and the like.

The memory device 2040 may store data necessary for an operation of the electronic device 2000. For example, the memory device 2040 may include a volatile memory device, such as a Dynamic Random Access Memory (DRAM) or a Static Random Access Memory (SRAM) and a nonvolatile memory device, such as an Erasable Programmable Read-Only Memory (EPROM), an Electrically Erasable Programmable Read-Only Memory (EEPROM), or a flash memory device. The processor 2020 may control the image sensor 2010 and the output device 2060 by executing a command set stored in the memory device 2040.

The input device 2050 may include an input means, such as a keyboard, a keypad, or a mouse, and the output device 2060 may include an output means such as a printer or a display.

The image sensor 2010 may be implemented with various types of packages. For example, components of at least a portion of the image sensor 2010 may be implemented by using packages, such as Package-on-Package (POP), Ball Grid Arrays (BGAs), Chip Scale Packages (CSPs), Plastic Leaded Chip Carrier (PLCC), Plastic Dual In-line Package (PDIP), Die in Waffle Pack, Die in Wafer Form, Chip-On-Board (COB), CERamic Dual In-line Package (CERDIP), Plastic Metric Quad Flat Pack (MQFP), Thin Quad Flat Pack (TQFP), Small Outline (SOIC), Shrink Small Outline Package (SSOP), Thin Small Outline (TSOP), System In Package (SIP), Multi-Chip Package (MCP), Wafer-level Fabricated Package (WFP), Wafer-level Processed Stack Package (WSP), and Wafer-level Processed Package (WSP).

Meanwhile, the electronic device 2000 may be interpreted as all computing systems that use the image sensor 2010. The electronic device 2000 may be implemented in the form of a packaged module, a component, or the like. For example, the electronic device 2000 may be implemented as a digital camera, a mobile device, a smart phone, a Personal Computer (PC), a tablet PC, a notebook computer, a Personal Digital Assistant (PDA), an Enterprise Digital Assistant (EDA), a Portable Multimedia Player (PMP), a wearable device, a black box, a robot, an autonomous vehicle, or the like.

In accordance with the present disclosure, there can be provided an image processing device and an image processing method, which can reduce point noise that may be generated in a pixel value correction of a PDAF pixel in an image of low complexity.

While the present disclosure has been shown and described with reference to certain exemplary embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described exemplary embodiments but should be determined by not only the appended claims but also the equivalents thereof.

In the above-described embodiments, all steps may be selectively performed or part of the steps and may be omitted. In each embodiment, the steps are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made based on the technological scope of the present disclosure.

Meanwhile, the exemplary embodiments of the present disclosure have been described in the drawings and specification. Although specific terminologies are used here, those are only to explain the embodiments of the present disclosure. Therefore, the present disclosure is not restricted to the above-described embodiments and many variations are possible within the spirit and scope of the present disclosure. It should be apparent to those skilled in the art that various modifications can be made based on the technological scope of the present disclosure in addition to the embodiments disclosed herein.

What is claimed is:

1. An image processing device comprising:
    a target pixel set determiner configured to determine a target pixel set, among a plurality of Phase Detection Auto Focus (PDAF) pixel sets, based on average values and variance values of pixel values output from a plurality of pixels corresponding to a kernel set based on each of the plurality of PDAF pixel sets, wherein the average values and the variance values respectively correspond to colors of color filters included in the plurality of pixels; and
    a pixel value corrector configured to convert pixel values of the target pixel set into first pixel values corresponding to a predetermined color and configured to correct the first pixel values to second pixel values corresponding to an arrangement pattern of the plurality of pixels based on pixel values of a plurality of adjacent pixels adjacent to the target pixel set.

2. The image processing device of claim 1, wherein the target pixel set determiner sets a plurality of average value sections and generates first threshold values corresponding to the plurality of average value sections.

3. The image processing device of claim 2, wherein the target pixel set determiner determines second threshold values respectively corresponding to the colors of the color filters, among the first threshold values, based on the average values.

4. The image processing device of claim 2, wherein the target pixel set determiner sets the plurality average value sections to be different from each other according to the colors of the color filters and generates the first threshold values to be different from each other according to the colors of the color filters.

5. The image processing device of claim 3, wherein, when the variance values are smaller than the second threshold values respectively corresponding to the variance values, the target pixel set determiner determines, as the target pixel set, a PDAF pixel set, among the plurality of PDAF pixel sets, which becomes a basis of the kernel corresponding to the plurality of pixels of which the variance values are determined.

6. The image processing device of claim 1, wherein the pixel value corrector calculates a calibration gain value based on a ratio between a target pixel value output from PDAF pixels included in the target pixel set, among the plurality of pixels, and a normal pixel value output from normal pixels except the PDAF pixels and generates the first pixel values based on an average pixel value of the target pixel set and the calibration gain value.

7. The image processing device of claim 6, wherein the pixel value corrector determines a color of color filters included in target pixels included in the target pixel set based on the arrangement pattern.

8. The image processing device of claim 7, wherein the pixel value corrector converts the first pixel values into third pixel values corresponding to the color of the color filters included in the target pixels and calculates the second pixel value based on an average pixel value of pixels corresponding to the color of the color filters included in the target pixels, among the plurality of adjacent pixels.

9. The image processing device of claim 8, wherein the pixel value corrector determines a weight of the third pixel values based on the average values or the variance values and calculates the second pixel values based on the weight.

10. The image processing device of claim 1, wherein the target pixel set corresponds to a region in which complexity of an image is lower than a reference value.

11. The image processing device of claim 1, wherein the plurality of pixels include a plurality of normal pixels and a plurality of PDAF pixels, and the first pixel values are normal pixel values based on pixel values of the plurality of normal pixels, and
    wherein the pixel value corrector converts the pixel values of the target pixel set into the normal pixel values according to a characteristic difference between the plurality of normal pixels and the plurality of PDAF pixels.

12. An image processing device comprising:
    a target pixel set determiner configured to determine a target pixel set, among a plurality of Phase Detection Auto Focus (PDAF) pixel sets, based on average values and variance values of pixel values output from a plurality of pixels including a plurality of normal pixels and a plurality of PDAF pixels; and
    a pixel value corrector configured to convert pixel values of the target pixel set into normal pixel values based on pixel values of the plurality of normal pixels and configured to correct the normal pixel values to pixel values corresponding to an arrangement pattern of the plurality of pixels based on pixel values of a plurality of adjacent pixels adjacent to the target pixel set,
    wherein the plurality of pixels corresponds to a kernel set based on each of the plurality of PDAF pixel sets, and wherein the average values and the variance values respectively correspond to colors of color filters included in the plurality of pixels.

13. The image processing device of claim 12, wherein the target pixel set determiner sets threshold values with respect to the colors based on the average values and determines the target pixel set based on the threshold values with respect to the colors and the variance values.

14. The image processing device of claim 13, wherein the target pixel set determiner determines, as the target pixel set, a PDAF pixel set in which each of the variance values is smaller than the threshold values with respect to the colors.

15. The image processing device of claim 12, wherein the pixel value corrector converts the pixel values of the target pixel set into the normal pixel values according to a characteristic difference between the plurality of normal pixels and the plurality of PDAF pixels.

16. The image processing device of claim 15, wherein, based on the arrangement pattern, the pixel value corrector determines a color of color filters included in target pixels included in the target pixel set.

17. The image processing device of claim 16, wherein the pixel value corrector converts the normal pixel values into color pixel values corresponding to the color of the color filters included in the target pixels and corrects the color pixel values based on an average pixel value of pixels corresponding to the color of the color filters included in the target pixels, among the plurality of adjacent pixels.

18. An image processing method comprising:
calculating average values and variance values respectively corresponding to colors of color filters included in a plurality of pixels corresponding to a kernel set based on each of a plurality of Phase Detection Auto Focus (PDAF) pixel sets;
determining a target pixel set, among the plurality of PDAF pixel sets, corresponding to a flat surface as a region in which complexity of an image is lower than a reference value, based on the average values and the variance values;
converting pixel values of the target pixel set into first pixel values corresponding to a predetermined color; and
correcting the first pixel values to second pixel values corresponding to an arrangement pattern of the plurality of pixels based on pixel values of a plurality of adjacent pixels adjacent to the target pixel set.

* * * * *